(12) United States Patent
Su et al.

(10) Patent No.: US 12,287,565 B2
(45) Date of Patent: Apr. 29, 2025

(54) DRIVING MECHANISM

(71) Applicant: TDK TAIWAN CORP., Taoyuan (TW)

(72) Inventors: Xuan-Huan Su, Taoyuan (TW); Ko-Lun Chao, Taoyuan (TW); Yu-Chi Kuo, Taoyuan (TW); Yung-Yun Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 196 days.

(21) Appl. No.: 18/156,157

(22) Filed: Jan. 18, 2023

(65) Prior Publication Data
US 2023/0236477 A1 Jul. 27, 2023

Related U.S. Application Data

(60) Provisional application No. 63/301,836, filed on Jan. 21, 2022.

(51) Int. Cl.
*G03B 9/36* (2021.01)
*G02B 7/09* (2021.01)
*G02B 27/64* (2006.01)

(52) U.S. Cl.
CPC .................. *G03B 9/36* (2013.01); *G02B 7/09* (2013.01); *G02B 27/646* (2013.01)

(58) Field of Classification Search
CPC ....................................................... G03B 9/36
See application file for complete search history.

(56) References Cited

U.S. PATENT DOCUMENTS

| | | | | |
|---|---|---|---|---|
| 11,226,466 B2* | 1/2022 | Wang | ..................... | G02B 26/02 |
| 11,740,428 B2* | 8/2023 | Hung | ....................... | H01F 7/02 |
| | | | | 396/448 |
| 11,991,436 B2* | 5/2024 | Wang | ..................... | G03B 9/36 |
| 11,994,795 B2* | 5/2024 | Wang | ..................... | G03B 17/12 |
| 2021/0149272 A1* | 5/2021 | Li | ............................. | H04N 23/55 |
| 2021/0200062 A1* | 7/2021 | Abe | ...................... | G06F 1/1656 |
| 2022/0091478 A1* | 3/2022 | Sawanobori | ........ | G03B 11/043 |
| 2022/0120997 A1* | 4/2022 | Wang | ..................... | G03B 5/02 |
| 2022/0334294 A1* | 10/2022 | Wang | ..................... | G02B 5/005 |
| 2022/0382129 A1* | 12/2022 | Wu | ............................ | G03B 11/043 |
| 2023/0071345 A1* | 3/2023 | Wu | ............................ | G03B 9/36 |
| 2023/0230739 A1* | 7/2023 | Chen | .................... | H04N 23/687 |
| | | | | 335/209 |

* cited by examiner

*Primary Examiner* — Clayton E. LaBalle
*Assistant Examiner* — Diana Hancock
(74) *Attorney, Agent, or Firm* — Muncy, Geissler, Olds & Lowe, P.C.

(57) ABSTRACT

A driving mechanism for moving an optical element is provided, including a fixed part, a movable part, movably connected to the fixed part, a positioning structure, and a driving assembly. The optical element is disposed on the movable part, and the positioning structure is formed on the fixed part to restrict the movable part in a specific position relative to the fixed part. The driving assembly is configured to drive the movable part to move relative to the fixed part.

17 Claims, 12 Drawing Sheets

DRIVING MECHANISM

CROSS REFERENCE TO RELATED APPLICATIONS

This application claims the benefit of U.S. Provisional Application No. 63/301,836, filed Jan. 21, 2022, the entirety of which is incorporated by reference herein.

BACKGROUND OF THE INVENTION

Field of the Invention

The present invention relates to a driving mechanism, and, in particular, to a driving mechanism that drives an optical element to move.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

It can be difficult to reduce the size of the shutter or aperture mechanism in the camera module of some electronic devices. Additionally, the movable mechanism inside these electronic devices may be damaged when the unit collides with external objects. Addressing these problems has become a challenge.

BRIEF SUMMARY OF THE INVENTION

An embodiment of the present invention provides a driving mechanism for moving an optical element. The driving mechanism includes a fixed part, a movable part, movably connected to the fixed part, a positioning structure, and a driving assembly. The optical element is disposed on the movable part, and the positioning structure is formed on the fixed part to restrict the movable part in a specific position relative to the fixed part. The driving assembly is configured to drive the movable part to move relative to the fixed part.

In some embodiments, the positioning structure has a first recess, and the movable part has a first protrusion received in the first recess when the movable part is in a first position relative to the fixed part.

In some embodiments, the positioning structure further has a second recess, and the movable part has a second protrusion received in the second recess when the movable part is in the first position relative to the fixed part.

In some embodiments, the positioning structure further has a third recess, and when the driving assembly drives the movable part to move from the first position to a second position relative to the fixed part, the first protrusion is received in the third recess.

In some embodiments, the positioning structure further has a fourth recess, and when the driving assembly drives the movable part to move from the first position to the second position relative to the fixed part, the second protrusion is received in the fourth recess.

In some embodiments, the positioning structure further has a first slope surface connecting the first recess to the third recess.

In some embodiments, when the driving assembly drives the movable part to move from the first position to the second position relative to the fixed part, the first protrusion slides from the first recess along the first slope surface to the third recess.

In some embodiments, the fixed part has a first sidewall, and the first slope surface is located between the first recess and the first sidewall.

In some embodiments, the driving mechanism further includes a cover connected to the fixed part, wherein the cover has a top surface and an opening formed on the top surface, and when the movable part is located in the first position relative to the fixed part, the optical element blocks the opening, wherein an included angle is formed between the first slope surface and the top surface, and the included angle is greater than 0 degree and less than 5 degree.

In some embodiments, the positioning structure further has a second slope surface connected between the second recess and the fourth recess.

In some embodiments, when the driving assembly drives the movable part to move from the first position to the second position relative to the fixed part, the second protrusion slides from the second recess along the second slope surface to the fourth recess.

In some embodiments, the fixed part has a second sidewall, and the second slope surface is located between the fourth recess and the second sidewall.

In some embodiments, the driving mechanism further includes a cover connected to the fixed part, wherein the cover has a top surface and an opening formed on the top surface, and when the movable part is located in the first position relative to the fixed part, the optical element blocks the opening, wherein an included angle is formed between the second slope surface and the top surface, and the included angle is greater than 0 degree and less than 5 degree.

In some embodiments, the driving mechanism further includes a sensing circuit, wherein the movable part has a conductive leg, and the positioning structure has a first cavity, wherein the sensing circuit is exposed to the first cavity, and the conductive leg is received in the first cavity and contacts the sensing circuit when the movable part is in a first position relative to the fixed part.

In some embodiments, the sensing circuit has a first terminal and a second terminal exposed to the first cavity, and the conductive leg is electrically connected to the first and second terminals when the movable part is in the first position relative to the fixed part.

In some embodiments, the positioning structure further has a second cavity, and the sensing circuit further has a third terminal and a fourth terminal exposed to the second cavity, wherein when the driving assembly drives the movable part to move from the first position to a second position relative to the fixed part, the conductive leg is received in the second cavity and electrically connected to the third and fourth terminals.

In some embodiments, the first, second, third, and fourth terminals are embedded in the fixed part by insert molding.

In some embodiments, the second and third terminals are electrically connected to each other.

In some embodiments, the conductive leg has a V-shaped or U-shaped structure.

In some embodiments, the driving assembly has a magnet disposed on the movable part and a coil disposed on the fixed part.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
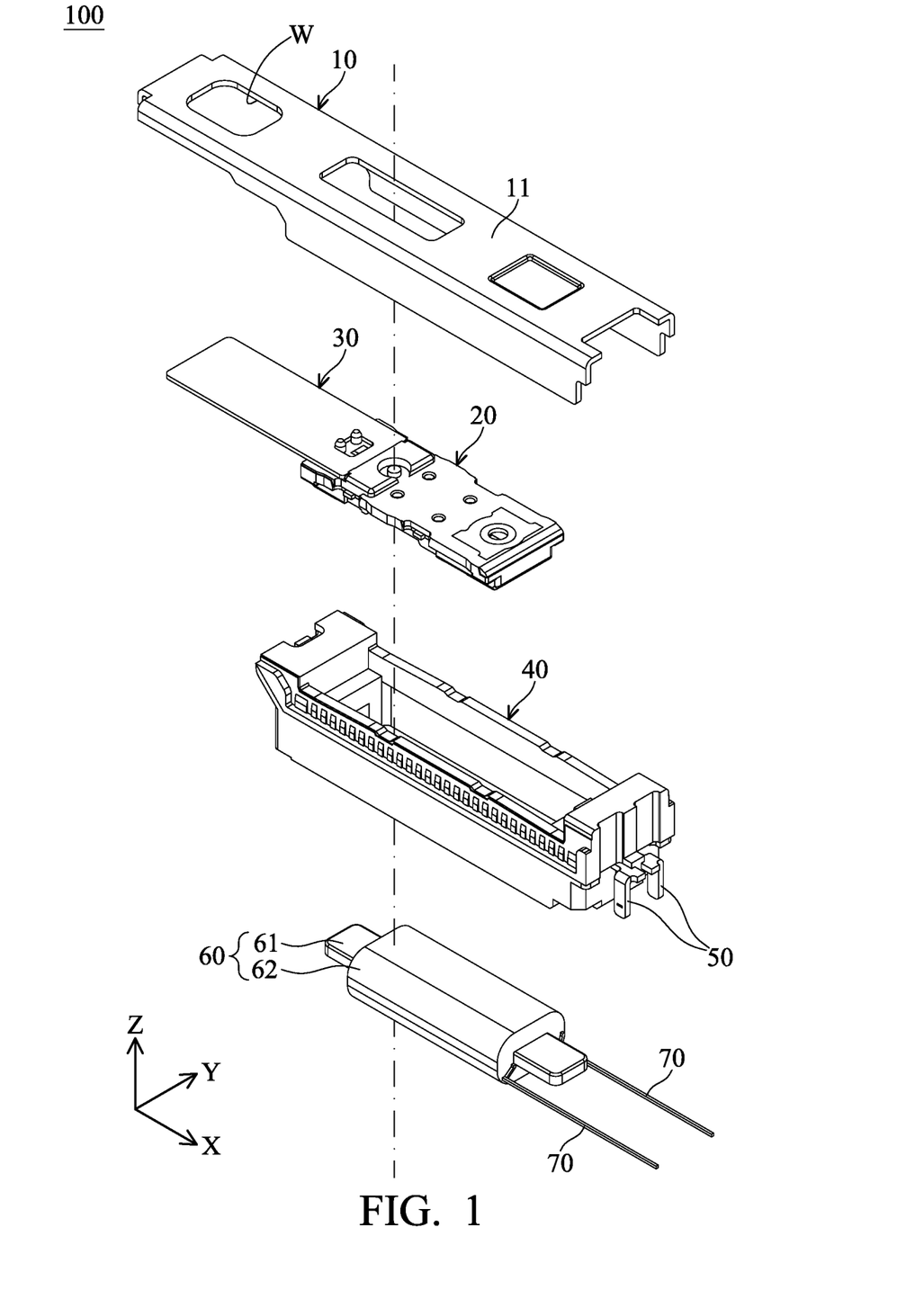
FIGS. 1 and 2 are exploded diagrams of a driving mechanism 100 in accordance with an embodiment of the invention.
Figure 2:
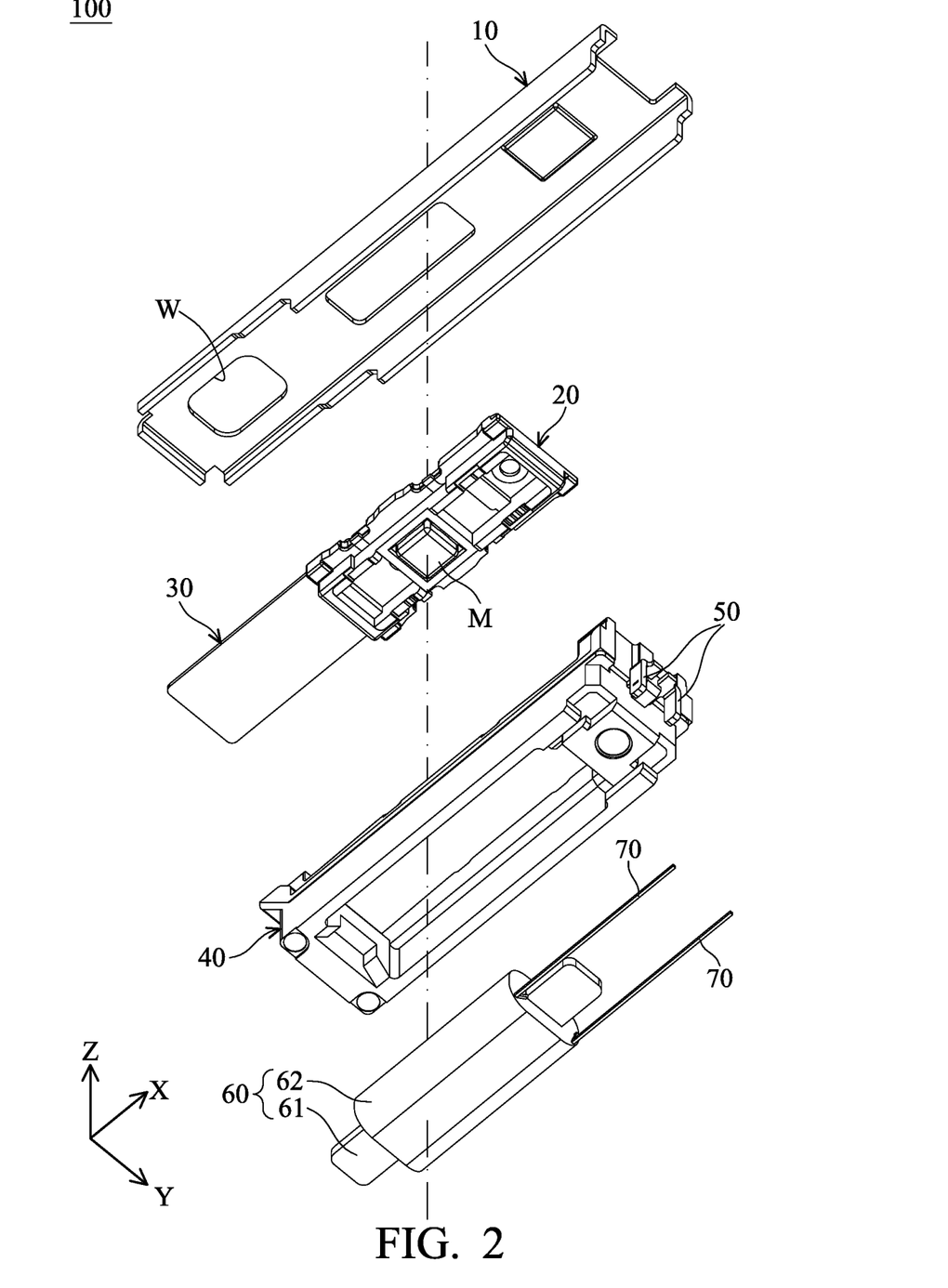
Figure 3:
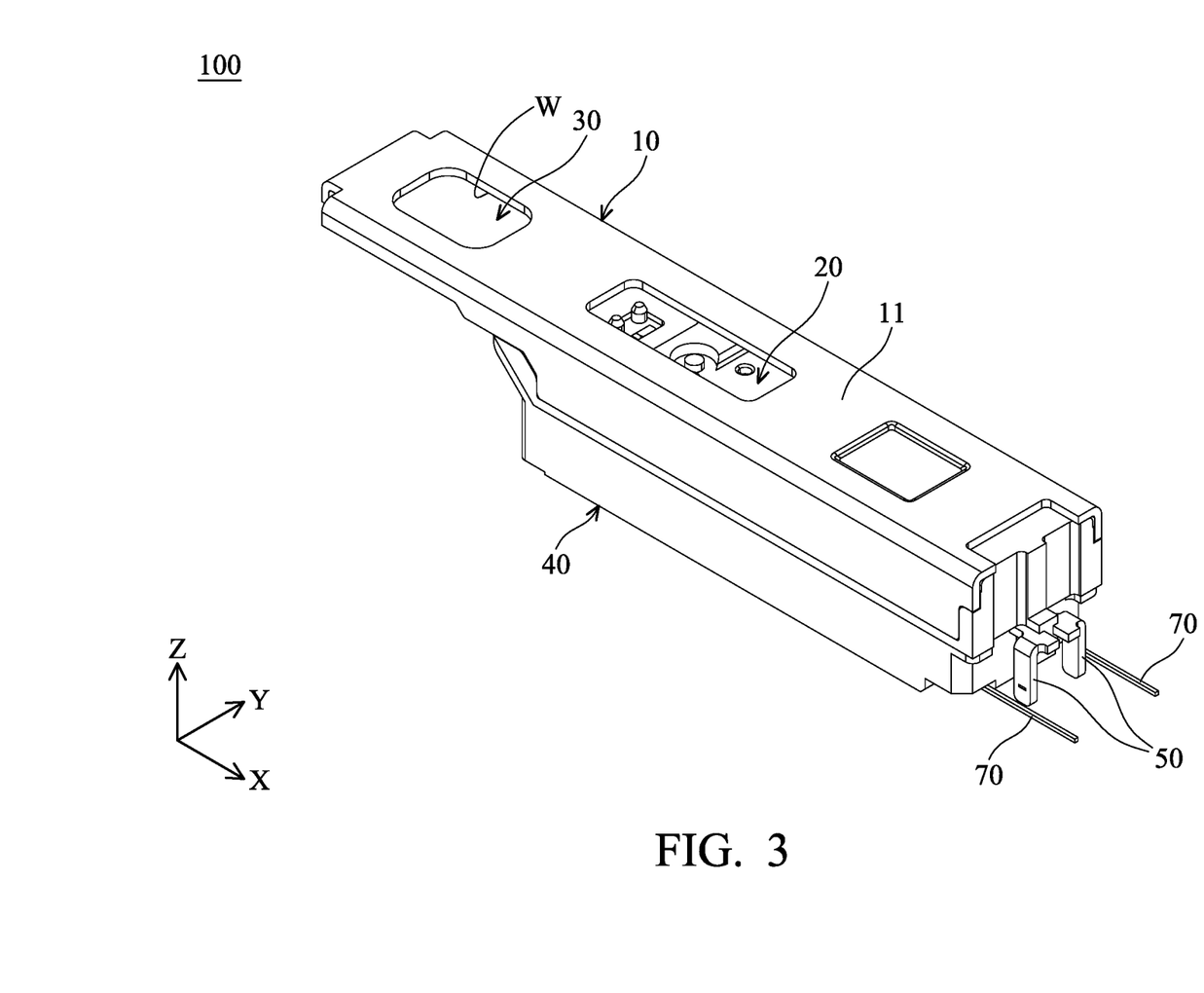
FIGS. 3 and 4 are perspective diagrams of the driving mechanism 100 in FIGS. 1 and 2 after assembly.
Figure 4:
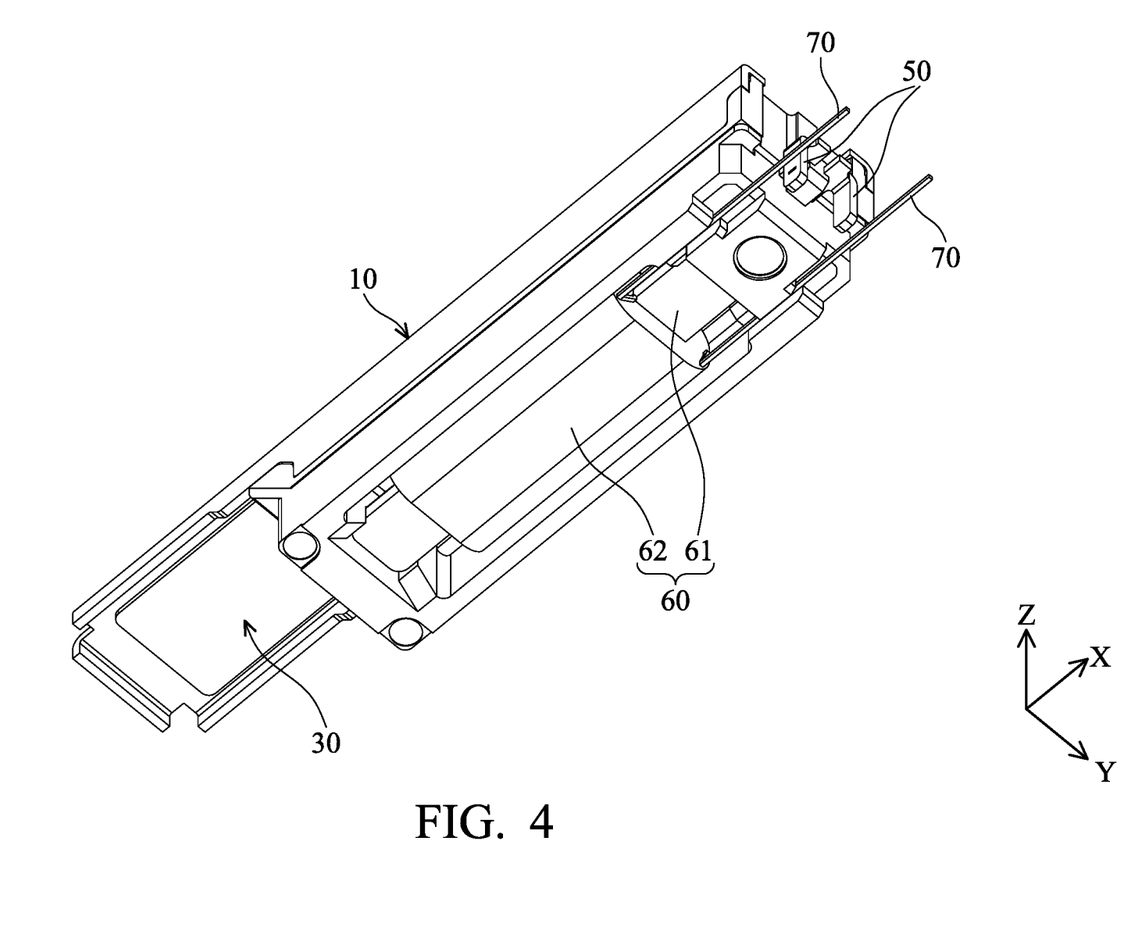

FIGS. 1 and 2 are exploded diagrams of a driving mechanism 100 in accordance with an embodiment of the invention. FIGS. 3 and 4 are perspective diagrams of the driving mechanism 100 in FIGS. 1 and 2 after assembly.

Referring to FIGS. 1-4, the driving mechanism 100 may be disposed in a cell phone, laptop computer, or other electronic devices. In this embodiment, the driving mechanism 100 primarily comprises a cover 10, a slider 20 (movable part), an optical element 30, a hollow base 40 (fixed part), two pins 50, a coil unit 60, and two wires 70.

The cover 10 is mounted to the base 40, and the optical element 30 is affixed to the slider 20. It should be noted that the movable part 20 (movable part) can slide relative to the base 40 (fixed part) along the X axis.

As shown in FIGS. 1-4, an opening W is formed on the top surface 11 of the cover 10. The optical element 30 may be a camera shutter blade to block the opening W, whereby the driving mechanism 100 may can be used as a shutter or aperture of a camera unit in the electronic device.

The movable part 20 may comprise plastic material, and the optical element 30 may comprise light shading material. When the slider 20 and the optical element 30 are located in a first position, as shown in FIGS. 3 and 4, the opening W is blocked by the optical element 30, and light can be prevented from entering the driving mechanism 100 through the opening W to an image sensor (not shown) in the electronic device.

Additionally, a magnetic element M (e.g. magnet) is disposed on the bottom side of the slider 20, and the coil unit 60 is disposed in the base 40. The coil unit 60 has a yoke 61 and a coil 62 wound on the yoke 61, and the coil 62 can be electrically connected to an external circuit via the wires 70. In some embodiments, the pins 50 can be integrally formed with the base 40 by insert molding, and a sensing circuit embedded in the base 40 can be electrically connected to the external circuit via the pins 50.

When the external circuit applies a current signal through the wires 70 to the coil 62, the magnetic element M and the coil 62 (driving assembly) can generate an electromagnetic force to move the slider 20 and the optical element 30 relative to the base 40 in the X or -X direction, thereby blocking the opening W by the optical element 30, or allowing light entering the driving mechanism 100 through the opening 11 and then reaching the image sensor in the electronic device.

Figure 5:
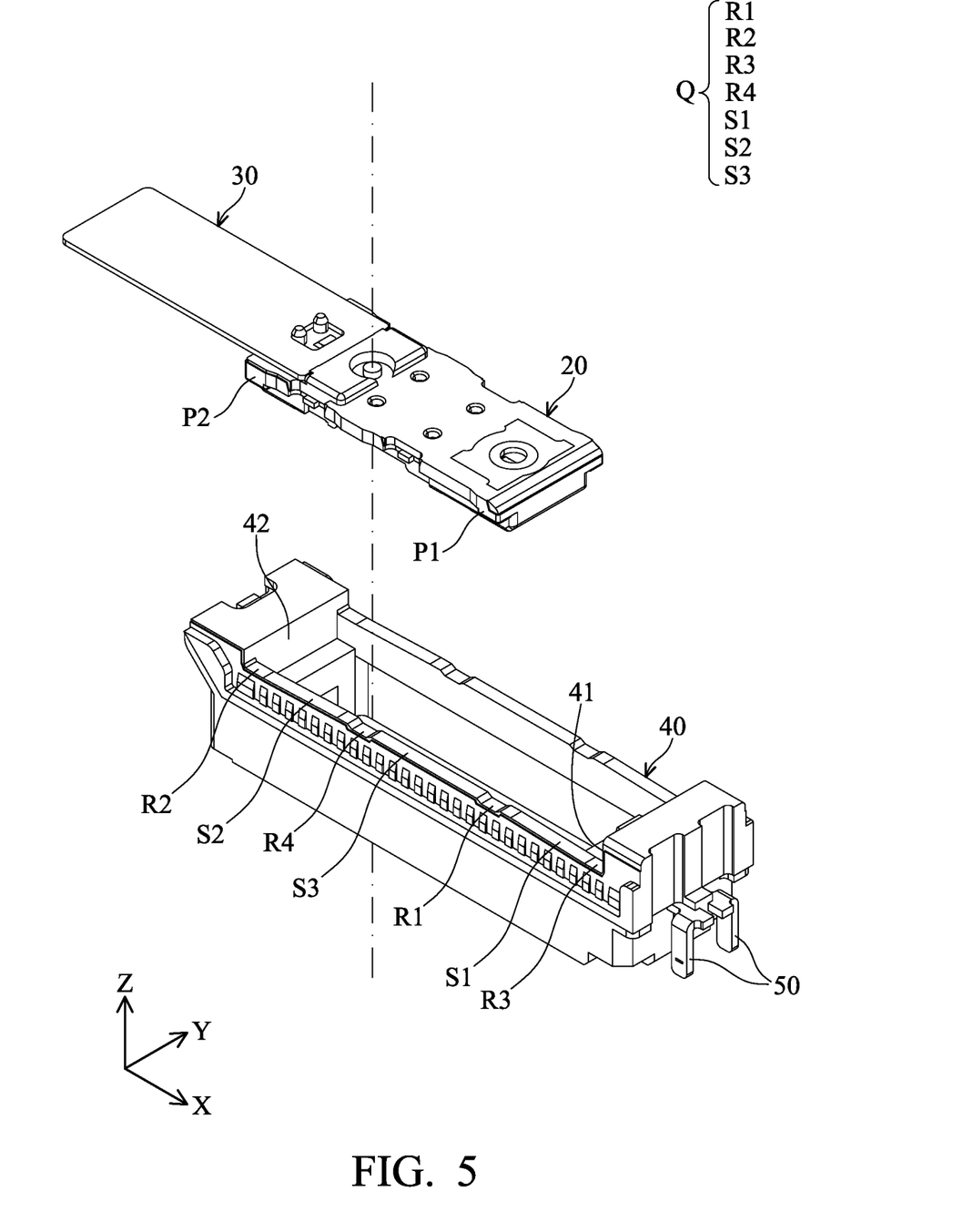
FIG. 5 is an exploded diagram of the slider 20, the optical element 30, and the base 40 before assembly.
Figure 6:
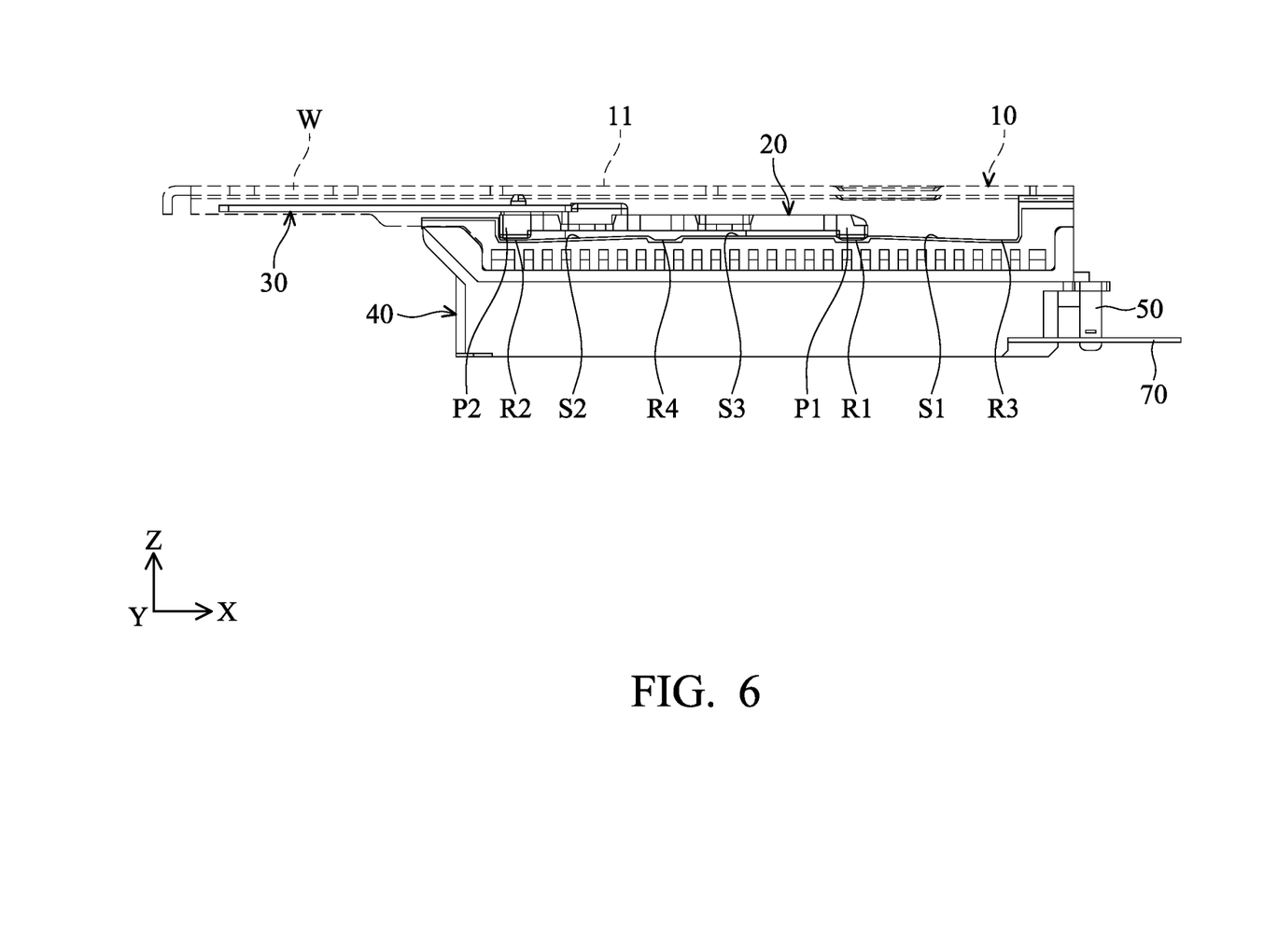
FIG. 6 is a schematic diagram of the slider 20 and the optical element 30 when in a first position relative to the base 40.
Figure 7:
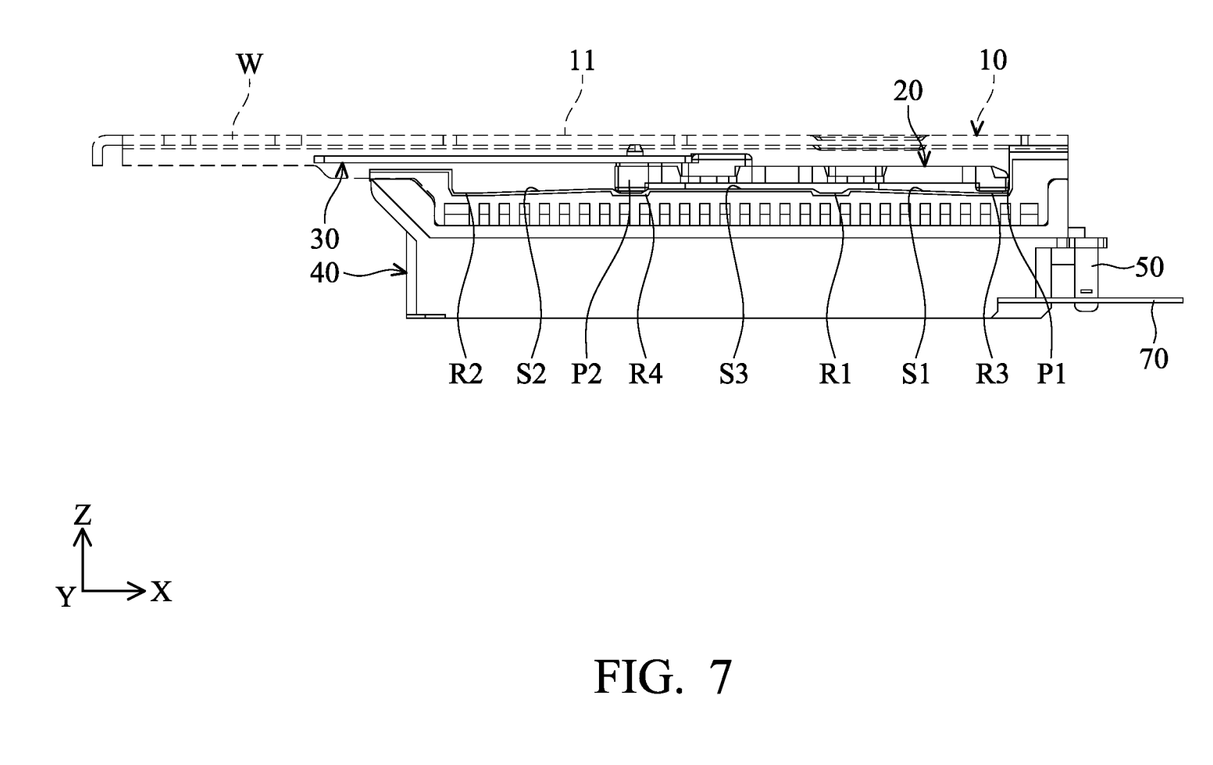
FIG. 7 is a schematic diagram of the slider 20 and the optical element 30 when moving in the X direction relative to the base 40 from the first position of FIG. 6 to a second position.
Figure 8:
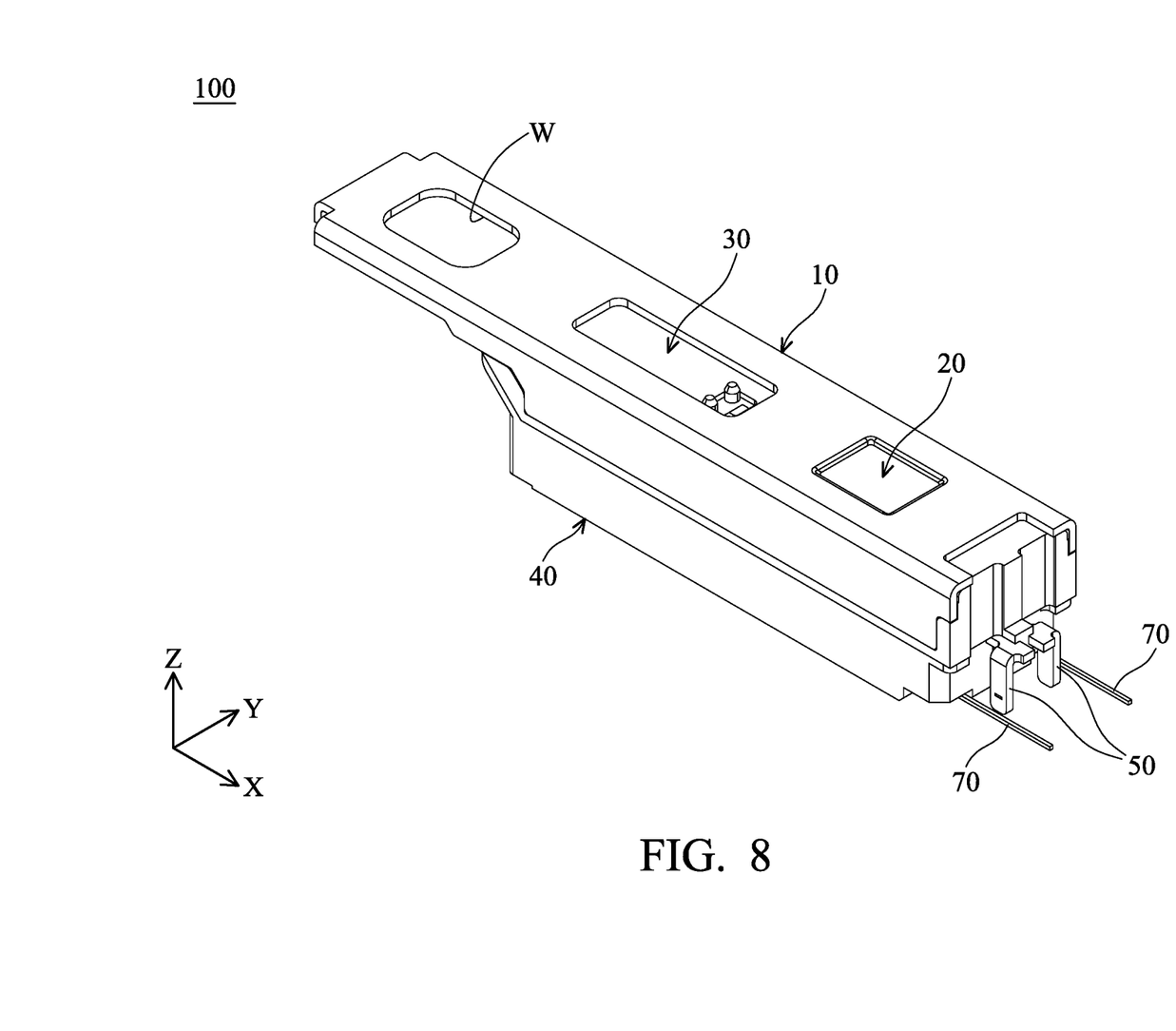
FIG. 8 is a perspective diagram of the driving mechanism 100 when the slider 20 and the optical element 30 are in the second position relative to the base 40.

FIG. 5 is an exploded diagram of the slider 20, the optical element 30, and the base 40 before assembly. FIG. 6 is a schematic diagram of the slider 20 and the optical element 30 when in a first position relative to the base 40. FIG. 7 is a schematic diagram of the slider 20 and the optical element 30 when moving in the X direction relative to the base 40 from the first position of FIG. 6 to a second position. FIG. 8 is a perspective diagram of the driving mechanism 100 when the slider 20 and the optical element 30 are in the second position relative to the base 40.

Referring to FIG. 5, the slider 20 forms a first protrusion P1 and a second protrusion P2. The base 40 forms a first recess R1, a second recess R2, a third recess R3, a fourth recess R4, a first slope surface S1, a second slope surface S2, a flat surface S3, a first sidewall 41, and a second sidewall 42. The first slope surface S1 is connected between the first and third recesses R1 and R3, and the second slope surface S1 is connected between the second and fourth recesses R2 and R4. The third recess R3 is located adjacent to the first sidewall 41, and the second recess R2 is located adjacent to the second sidewall 42. Here, the first slope surface S1 is located between the first recess R1 and the first sidewall 41, and the second slope surface S2 is located between the fourth recess R4 and the second sidewall 42.

In this embodiment, the first recess R1, the second recess R2, the third recess R3, the fourth recess R4, the first slope surface S1, the second slope surface S2, and the flat surface S3 constitute a positioning structure Q. The positioning structure Q is located between the first sidewall 41 and the second sidewall 42 to restrict the slider 20 in at least a specific position on the base 40. Thus, displacement of the slider 20 relative to the base 40 can be prevented when impacted by an external force, thereby facilitating high performance and reliability of the driving mechanism 100.

As shown in FIG. 6, when the slider 20 is in the first position relative to the base 40, the first protrusion P1 is received in the first recess R1, and the second protrusion P2 is received in the second recess R2. It should be noted that the second protrusion P2 in the second recess R2 is lower than the first protrusion P1 in the first recess R1, and the second and fourth recesses R2 and R4 are connected to each other via the second slope surface S2. Therefore, the slider 20 can be stably restricted in the first position. In this state, the opening W is blocked by the optical element 30, and light can be prevented from entering the driving mechanism 100 through the opening W to the image sensor in the electronic device.

Moreover, as shown in FIG. 7, when the external circuit applies a current signal through the wires 70 to the coil 62, the magnetic element M and the coil 62 (driving assembly) generate an electromagnetic force to move the slider 20 and the optical element 30 relative to the base 40 from the first position to the second position in the X direction. During the movement of the slider 20 and the optical element 30, the first protrusion P1 slide from the first recess R1 along the first slope surface S1 to the third recess R3, and the second protrusion P2 slide from the second recess R4 along the second slope surface S2 to the fourth recess R4.

It should be noted that the first protrusion P1 in the third recess R3 is lower than the second protrusion P2 in the fourth recess R4, and the first and third recesses R1 and R3 are connected to each other via the first slope surface S1. Therefore, the slider 20 can be stably restricted in the second position. In this state, the opening W is not blocked by the optical element 30, and light can enter the driving mechanism 100 through the opening 11 and then reach the image sensor in the electronic device.

In this embodiment, the top surface 11 of the cover 10 and the first slope surface S1 (or the second slope surfaces S1 and S2) define an included angle that is greater than 0 degree and less than 5 degree.

Figure 9:
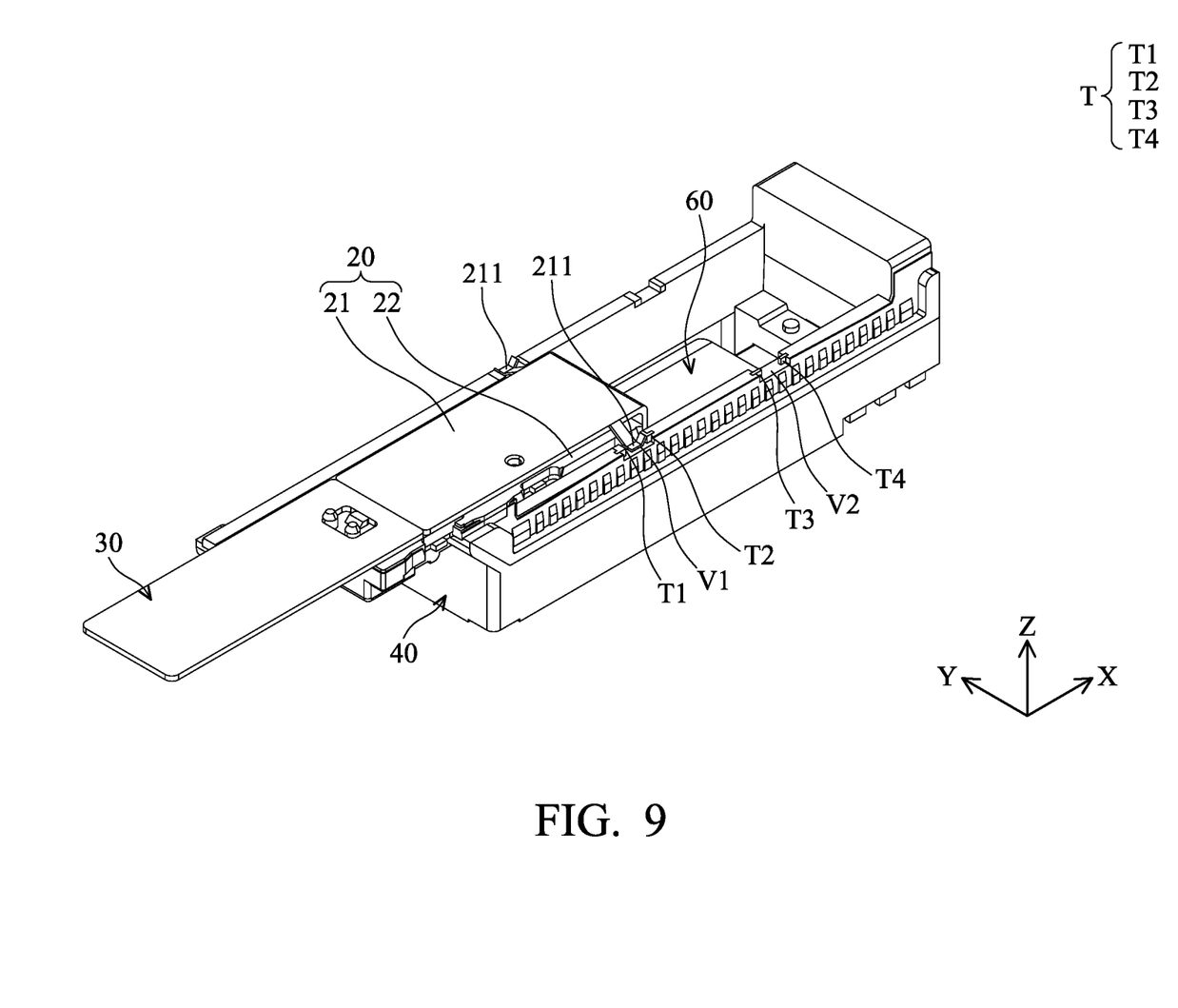
FIG. 9 is a perspective diagram of the slider 20 and the optical element 30 when in the first position relative to the base 40, in accordance with another embodiment of the invention.
Figure 10:
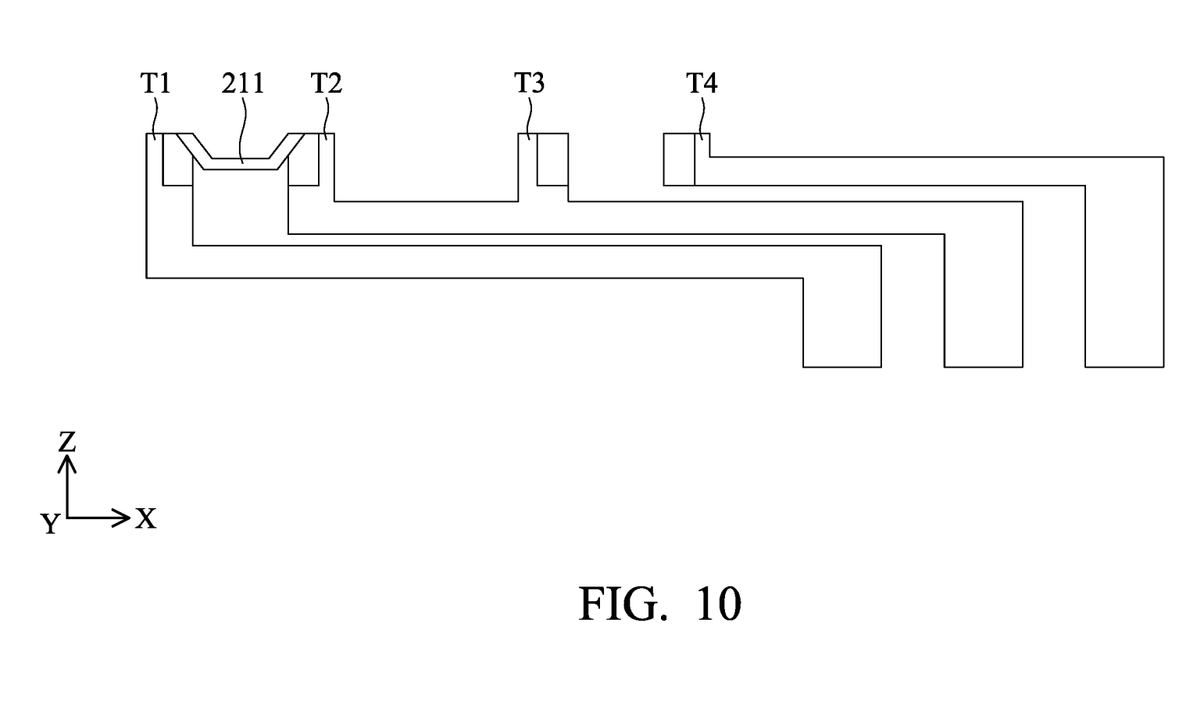
FIG. 10 is a schematic diagram showing the conductive leg 211 electrically connected to the first and second terminals T1 and T2.

FIG. 9 is a perspective diagram of the slider 20 and the optical element 30 when in the first position relative to the base 40, in accordance with another embodiment of the invention. FIG. 10 is a schematic diagram showing the conductive leg 211 electrically connected to the first and second terminals T1 and T2.

Referring to FIGS. 9 and 10, another embodiment of the slider 20 comprises a metal sheet 21 and an insulating body 22 (e.g. plastic material). The metal sheet 21 is affixed to the upper side of the insulating body 22, and the magnetite element M is disposed on the lower side of the insulating body 22. Specifically, two conductive leg 211 are formed on opposite sides of the metal sheet 21, and each of the conductive legs 211 has a V-shaped or U-shaped structure.

In this embodiment, the positioning structure on the base 40 includes a first cavity V1 and a second cavity V2, and a sensing circuit T is embedded in the base 40. The sensing circuit T comprises a first terminal T1, a second terminal T2, a third terminal T3, and a fourth terminal T4. The first terminal T1 and the second terminal T2 are exposed to the first cavity V1, and the third terminal T3 and the fourth terminal T4 are exposed to the second cavity V2.

Here, the first, second, third, and fourth terminals T1, T2, T3, and T4 are embedded in the base 40 by insert molding, and they can be electrically connected to the external circuit via the pins 50 or other conductive wires.

As shown in FIGS. 9 and 10, when the slider 20 and the optical element 30 are located in the first position relative to the base 40, the conductive leg 211 is restricted in the first cavity V1 and electrically connected to the first and second terminals T1, and T2. In this state, the sensing circuit T transmits a first sensing signal to the external circuit via the pins 50 or other conductive wires, whereby the position of the slider 20 and the optical element 30 can be determined.

Figure 11:
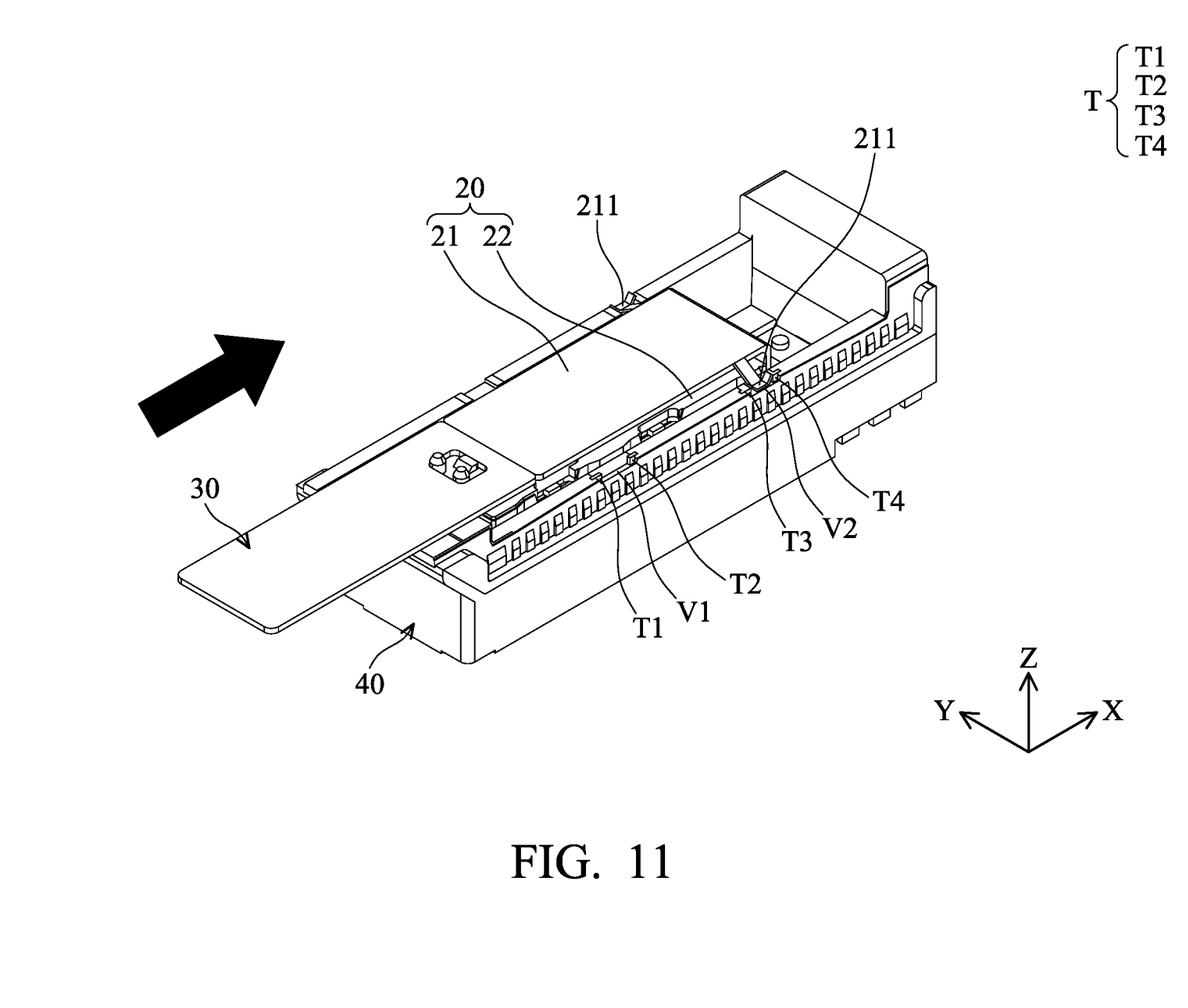
FIG. 11 is a perspective diagram of the slider 20 and the optical element 30 when sliding from the first position (FIG. 9) in the X direction to the second position relative to the base 40.
Figure 12:
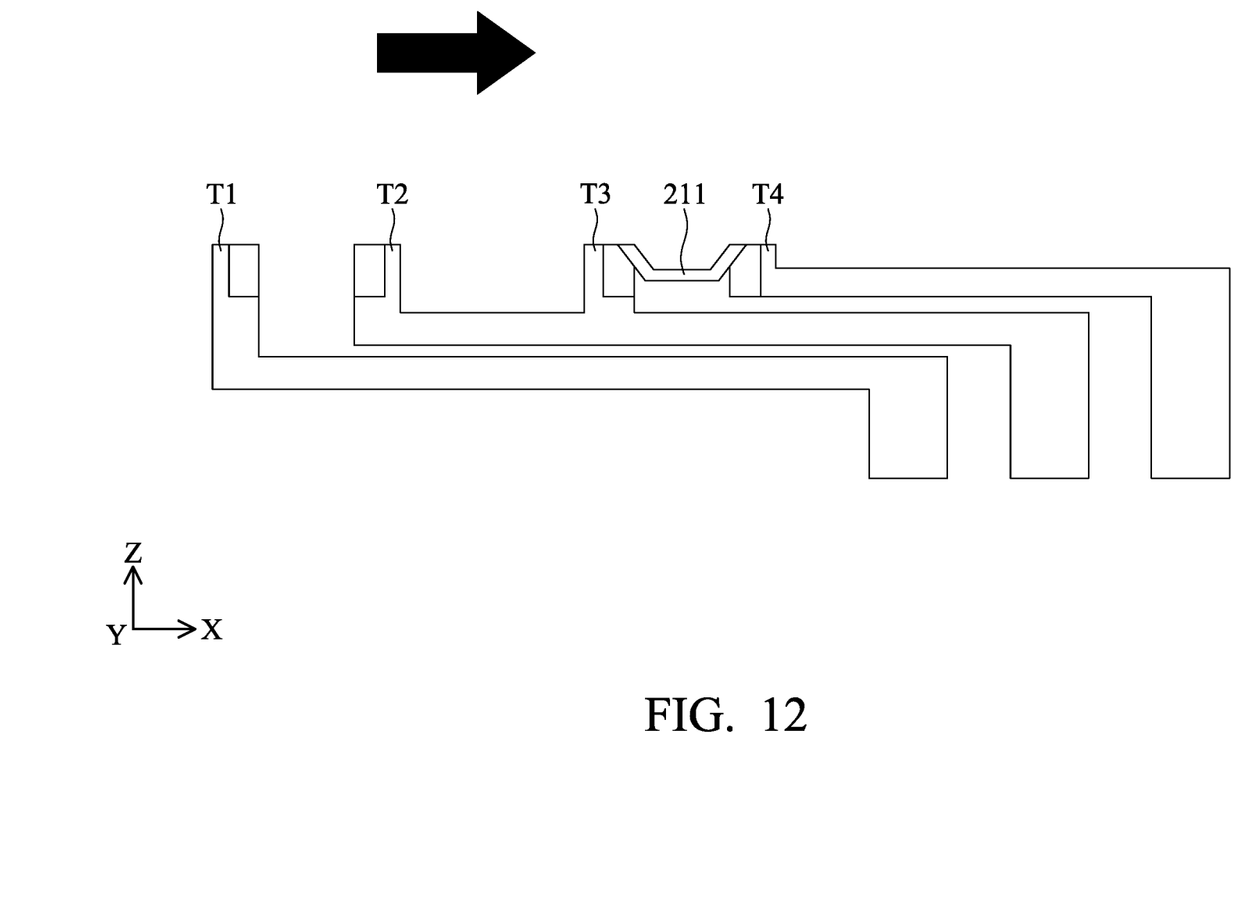
FIG. 12 is a schematic diagram showing the conductive leg 211 electrically connected to the third and fourth terminals T3 and T4.

FIG. 11 is a perspective diagram of the slider 20 and the optical element 30 when sliding from the first position (FIG. 9) in the X direction to the second position relative to the base 40. FIG. 12 is a schematic diagram showing the conductive leg 211 electrically connected to the third and fourth terminals T3 and T4.

Referring to FIGS. 11 and 12, when the slider 20 and the optical element 30 slide from the first position in the X direction to the second position relative to the base 40, the conductive leg 211 is restricted in the second cavity V2 and electrically connected to the third and fourth terminals T3 and T4. In this state, the sensing circuit T transmits a second sensing signal to the external circuit via the pins 50 or other conductive wires, whereby the position of the slider 20 and the optical element 30 can be determined.

With the conductive leg 211 formed on the slider 20 and the first and second cavities V1 and V2 formed on the base 40, the slider 20 can be stably restricted in the first position (FIG. 9) or the second position (FIG. 11) even when the driving mechanism 100 is impacted by an external force. Additionally, the conductive leg 211 can contact the sensing circuit T that is exposed to the first and second cavities V1 and V2, whereby the position of the slider 20 and the optical element 30 can be determined, and high performance and reliability of the driving mechanism 100 can also be achieved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:
 a fixed part;
 a movable part, movably connected to the fixed part and having a first protrusion, wherein the optical element is disposed on the movable part;
 a positioning structure, formed on the fixed part to restrict the movable part in a specific position relative to the fixed part, wherein the positioning structure has a first recess, a third recess, and a first slope surface connecting the first recess to the third recess, the first protrusion is received in the first recess when the movable part is in a first position relative to the fixed part; and
 a driving assembly, configured to drive the movable part to move relative to the fixed part, wherein when the driving assembly drives the movable part to move from the first position to a second position relative to the fixed part, the first protrusion is received in the third recess.

2. The driving mechanism as claimed in claim 1, wherein the positioning structure further has a second recess, and the movable part has a second protrusion received in the second recess when the movable part is in the first position relative to the fixed part.

3. The driving mechanism as claimed in claim 2, wherein the positioning structure further has a fourth recess, and when the driving assembly drives the movable part to move from the first position to the second position relative to the fixed part, the second protrusion is received in the fourth recess.

4. The driving mechanism as claimed in claim 3, wherein when the driving assembly drives the movable part to move from the first position to the second position relative to the fixed part, the first protrusion slides from the first recess along the first slope surface to the third recess.

5. The driving mechanism as claimed in claim 3, wherein the fixed part has a first sidewall, and the first slope surface is located between the first recess and the first sidewall.

6. The driving mechanism as claimed in claim 3, further comprising a cover connected to the fixed part, wherein the cover has a top surface and an opening formed on the top surface, and when the movable part is located in the first position relative to the fixed part, the optical element blocks the opening, wherein an included angle is formed between the first slope surface and the top surface, and the included angle is greater than 0 degree and less than 5 degree.

7. The driving mechanism as claimed in claim 3, wherein the positioning structure further has a second slope surface connected between the second recess and the fourth recess.

8. The driving mechanism as claimed in claim 7, wherein when the driving assembly drives the movable part to move from the first position to the second position relative to the fixed part, the second protrusion slides from the second recess along the second slope surface to the fourth recess.

9. The driving mechanism as claimed in claim 7, wherein the fixed part has a second sidewall, and the second slope surface is located between the fourth recess and the second sidewall.

10. The driving mechanism as claimed in claim 7, further comprising a cover connected to the fixed part, wherein the cover has a top surface and an opening formed on the top surface, and when the movable part is located in the first position relative to the fixed part, the optical element blocks the opening, wherein an included angle is formed between the second slope surface and the top surface, and the included angle is greater than 0 degree and less than 5 degree.

11. The driving mechanism as claimed in claim 1, further comprising a sensing circuit, wherein the movable part has a conductive leg, and the positioning structure has a first cavity, wherein the sensing circuit is exposed to the first cavity, and the conductive leg is received in the first cavity and contacts the sensing circuit when the movable part is in the first position relative to the fixed part.

12. The driving mechanism as claimed in claim 11, wherein the sensing circuit has a first terminal and a second terminal exposed to the first cavity, and the conductive leg is electrically connected to the first and second terminals when the movable part is in the first position relative to the fixed part.

13. The driving mechanism as claimed in claim 12, wherein the positioning structure further has a second cavity, and the sensing circuit further has a third terminal and a fourth terminal exposed to the second cavity, wherein when the driving assembly drives the movable part to move from the first position to the second position relative to the fixed part, the conductive leg is received in the second cavity and electrically connected to the third and fourth terminals.

14. The driving mechanism as claimed in claim 13, wherein the first, second, third, and fourth terminals are embedded in the fixed part by insert molding.

15. The driving mechanism as claimed in claim 14, wherein the second and third terminals are electrically connected to each other.

16. The driving mechanism as claimed in claim 11, wherein the conductive leg has a V-shaped or U-shaped structure.

17. The driving mechanism as claimed in claim 1, wherein the driving assembly has a magnet disposed on the movable part and a coil disposed on the fixed part.

* * * * *